(12) United States Patent
Guo et al.

(10) Patent No.: US 12,095,170 B2
(45) Date of Patent: Sep. 17, 2024

(54) CALIBRATION SYSTEM AND CALIBRATION METHOD FOR PHASED-ARRAY ANTENNA

(71) Applicants: Beijing BOE Technology Development Co., Ltd., Beijing (CN); BOE TECHNOLOGY GROUP CO., LTD., Beijing (CN)

(72) Inventors: Junwei Guo, Beijing (CN); Zongmin Liu, Beijing (CN); Xichao Fan, Beijing (CN); Wei Li, Beijing (CN); Feng Qu, Beijing (CN)

(73) Assignees: Beijing BOE Technology Development Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 341 days.

(21) Appl. No.: 17/548,559

(22) Filed: Dec. 12, 2021

(65) Prior Publication Data
US 2022/0311135 A1 Sep. 29, 2022

(30) Foreign Application Priority Data
Mar. 23, 2021 (CN) .......................... 202110308051.0

(51) Int. Cl.
*H01Q 3/36* (2006.01)
*G01R 29/10* (2006.01)
(Continued)

(52) U.S. Cl.
CPC .............. *H01Q 3/267* (2013.01); *H01Q 3/36* (2013.01); *H04B 7/0617* (2013.01); *H04B 17/12* (2015.01)

(58) Field of Classification Search
CPC ........ H01Q 3/267; H01Q 3/36; H04B 7/0617; H04B 17/12; G06N 3/006; G06N 3/126
See application file for complete search history.

(56) References Cited

U.S. PATENT DOCUMENTS 8,842,040 B1 * 9/2014 Dorsey ................ H01Q 3/2629
342/174
10,684,318 B1 * 6/2020 Kyrolainen .......... G01R 29/105
(Continued)

FOREIGN PATENT DOCUMENTS

CN 108322268 A 7/2018
CN 109541558 A 3/2019
(Continued)

OTHER PUBLICATIONS

China Patent Office, First Office Action dated Jul. 23, 2024, for corresponding Chinese application 202110308051.0.

*Primary Examiner* — Minh D A
(74) *Attorney, Agent, or Firm* — HOUTTEMAN LAW LLC

(57) ABSTRACT

A calibration system and a calibration method for a phased-array antenna are provided. The calibration system includes a receiving probe, a parameter tester, an upper computer and a beam controller. The receiving probe may acquire a beam signal, which is radiated by a to-be-tested phased-array antenna according to a provided microwave signal, at a preset position. The parameter tester may generate a test parameter according to the microwave signal and the beam signal. The upper computer may determine whether the to-be-tested phased-array antenna meets a preset index according to the test parameter, and in a case where the to-be-tested phased-array antenna does not meet the preset index, calculate the test parameter according to a genetic algorithm to generate optimized beam control data. The beam controller may generate a control voltage according to the optimized beam control data, and transmit the control voltage to the to-be-tested phased-array antenna.

20 Claims, 2 Drawing Sheets

(51) Int. Cl.
*H01Q 3/26* (2006.01)
*H04B 1/10* (2006.01)
*H04B 3/46* (2015.01)
*H04B 7/06* (2006.01)
*H04B 17/11* (2015.01)
*H04B 17/15* (2015.01)
*H04B 17/12* (2015.01)

(56) References Cited

U.S. PATENT DOCUMENTS

| | | |
|---|---|---|
| 2015/0236413 A1 | 8/2015 | Turpin |
| 2018/0006745 A1* | 1/2018 | Vanwiggeren ..... H04B 17/3912 |
| 2020/0395663 A1 | 12/2020 | Salman |

FOREIGN PATENT DOCUMENTS

| | | |
|---|---|---|
| CN | 111865444 A | 10/2020 |
| CN | 111987462 A | 11/2020 |

* cited by examiner

CALIBRATION SYSTEM AND CALIBRATION METHOD FOR PHASED-ARRAY ANTENNA

CROSS REFERENCE TO RELATED APPLICATIONS

The present application claims priority to Chinese patent application No. 202110308051.0, filed on Mar. 23, 2021, the content of which is incorporated herein by reference in its entirety.

TECHNICAL FIELD

The present disclosure relates to the field of antenna technology, and in particular, to a phased-array antenna calibration system (i.e., a calibration system for a phased-array antenna) and a phased-array antenna calibration method (i.e., a calibration method for a phased-array antenna).

BACKGROUND

For a phased-array antenna, a shape of a directional pattern of the whole antenna array may be changed by adjusting feeding phases of antenna units of the antenna array (i.e., by a beamforming technology), so as to achieve the purpose of beam scanning. The phased-array antenna may adopt a digital phase shifter to realize high-speed electronic control scanning of antenna beams and have advantages of a high speed and a high precision, and may be widely applied to the fields of vehicle-borne and ship-borne satellites, communication radars, millimeter wave base stations, and the like.

There are various types of phased-array antennas, one of which is a liquid crystal phased-array antenna. The liquid crystal phased-array antenna usually adopts a liquid crystal phase shifter as an antenna unit with a phase shifting function. Since the consistency of the characteristics of liquid crystal phase shifters is difficult to be ensured during a manufacturing process of the liquid crystal phase shifters, initial phases of antenna units in the liquid crystal phased-array antenna have a certain difference therebetween. A result caused by the difference is that an antenna beam cannot be scanned in an expected mode, so that a performance of the liquid crystal phased-array antenna is degraded. Therefore, the liquid crystal phased-array antenna needs to be calibrated. At present, the antenna units in the phased-array antenna are calibrated generally by using a mechanical tool, which needs a large amount of labor cost and cannot make calibration efficiency and precision of the phased-array antenna effectively meet calibration requirements, thereby degrading the performance of the liquid crystal phased-array antenna.

SUMMARY

Embodiments of the present disclosure provide a calibration system and a calibration method for a phased-array antenna.

A first aspect of the present disclosure provides a calibration system for a phased-array antenna, the calibration system including: a receiving probe, a parameter tester, an upper computer, and a beam controller; wherein the receiving probe is configured to acquire a beam signal, which is radiated by a to-be-tested phased-array antenna according to a provided microwave signal, at a preset position;

the parameter tester is configured to generate a test parameter according to the microwave signal and the beam signal;

the upper computer is configured to determine whether the to-be-tested phased-array antenna meets a preset index according to the test parameter, and in a case where the to-be-tested phased-array antenna does not meet the preset index, calculate the test parameter according to a genetic algorithm to generate optimized beam control data; and the beam controller is configured to generate a control voltage according to the optimized beam control data, and transmit the control voltage to the to-be-tested phased-array antenna.

In an embodiment, the upper computer is further configured to randomly generate a plurality of initial beam control data as an initial population according to the test parameter, wherein each of the plurality of initial beam control data in the initial population is an individual;

calculate gains of the to-be-tested phased-array antenna according to the plurality of initial beam control data, wherein the gains are used as adaptabilities of individuals in the initial population, respectively; and select some of the individuals, according to the adaptabilities of the individuals in the initial population, at a first preset probability, and replicate selected individuals into a next generation to generate the optimized beam control data.

In an embodiment, the first preset probability has a positive correlation with the adaptabilities.

In an embodiment, the upper computer is further configured to perform a crossover operation on some code fragments of the individuals entering the next generation, at a second preset probability.

In an embodiment, the crossover operation includes a single-point crossover operation or a multipoint crossover operation.

In an embodiment, the upper computer is further configured to perform a mutation operation on some code fragments of the individuals entering the next generation, at a third preset probability.

In an embodiment, the mutation operation includes a single-point mutation operation or a multipoint mutation operation.

In an embodiment, the calibration system further includes a microwave darkroom and a motion driver, wherein the to-be-tested phased-array antenna and the receiving probe are in the microwave darkroom; and the motion driver is configured to control the receiving probe to move along a scanning direction of the beam signal radiated by the to-be-tested phased-array antenna.

In an embodiment, the parameter tester includes a vector network analyzer.

In an embodiment, the parameter tester includes a spectrum analyzer and a microwave signal source.

In an embodiment, the parameter tester includes a power meter and a microwave signal source.

In an embodiment, the phased-array antenna includes a liquid crystal phased-array antenna.

A second aspect of the present disclosure provides a calibration method for a phased-array antenna, the calibration method including:

acquiring a beam signal, which is radiated by a to-be-tested phased-array antenna according to a provided microwave signal, at a preset position;

generating a test parameter according to the microwave signal and the beam signal;

determining whether the to-be-tested phased-array antenna meets a preset index according to the test parameter, and in a case where the to-be-tested phased-array antenna does not meet the preset index, calculating the test parameter according to a genetic algorithm to generate optimized beam control data; and generating a control voltage according to the optimized beam control data, and transmitting the control voltage to the to-be-tested phased-array antenna.

In an embodiment, the calibration method further includes:

randomly generating a plurality of initial beam control data as an initial population according to the test parameter, wherein each of the plurality of initial beam control data in the initial population is an individual;

calculating gains of the to-be-tested phased-array antenna according to the plurality of initial beam control data, and taking the gains as adaptabilities of individuals in the initial population; and selecting some of the individuals, according to the adaptabilities of the individuals in the initial population, at a first preset probability, and replicating selected individuals into a next generation to generate the optimized beam control data.

In an embodiment, the first preset probability is positively correlated with the adaptabilities.

In an embodiment, the calibration method further includes:

performing a crossover operation on some code fragments of the individuals entering the next generation, at a second preset probability.

In an embodiment, the crossover operation includes a single-point crossover operation or a multipoint crossover operation.

In an embodiment, the calibration method further includes:

performing a mutation operation on some code fragments of the individuals entering the next generation, at a third preset probability.

In an embodiment, the mutation operation includes a single-point mutation operation or a multipoint mutation operation.

A third aspect of the present disclosure provides a non-transitory computer-readable storage medium, having a computer program stored thereon, wherein the computer program, when executed by a processor, implements the calibration method for a phased-array antenna according to any one of the foregoing embodiments of the second aspect of the present disclosure.

DETAILED DESCRIPTION

Figure 1:
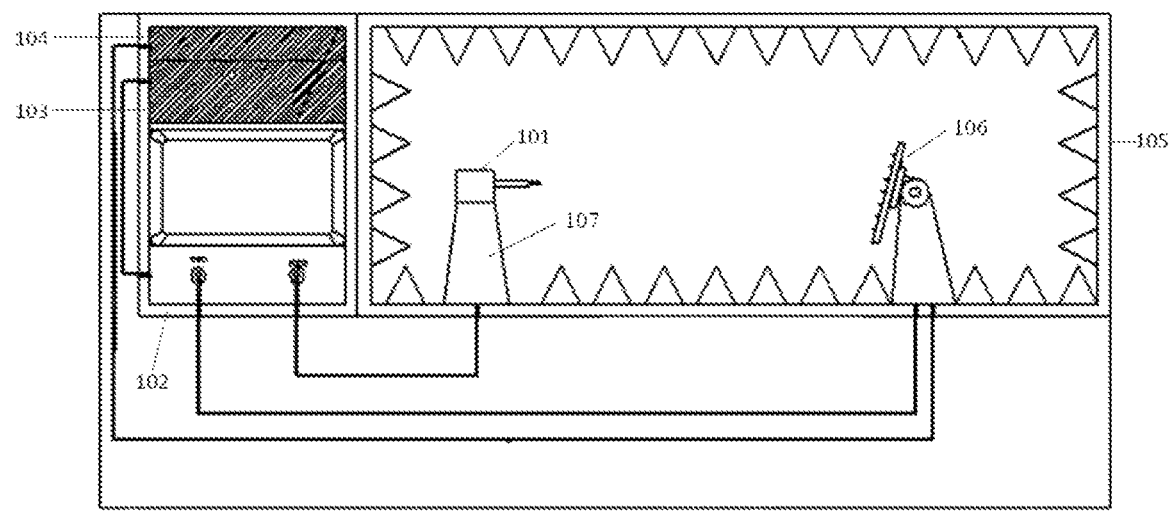
FIG. 1 is a schematic diagram showing a structure of a calibration system for a phased-array antenna according to an embodiment of the present disclosure.

To enable one of ordinary skill in the art to better understand technical solutions of the present disclosure, the present disclosure will be further described in detail below with reference to the accompanying drawings and exemplary embodiments.

Unless defined otherwise, technical or scientific terms used herein should have the same meaning as commonly understood by one of ordinary skill in the art to which the present disclosure belongs. The terms of "first", "second", and the like used in the present disclosure are not intended to indicate any order, quantity, or importance, but rather are used for distinguishing one element from another. Further, the term "a", "an", "the", or the like does not denote a limitation of quantity, but rather denotes the presence of at least one element. The term of "comprising", "including", or the like, means that the element or item preceding the term contains the element or item listed after the term and the equivalent thereof, but does not exclude the presence of other elements or items. The term "connected", "coupled", or the like is not limited to physical or mechanical connections, but may include electrical connections, whether direct or indirect connections. The terms "upper", "lower", "left", "right", and the like are used only for indicating relative positional relationships, and when the absolute position of an object being described is changed, the relative positional relationships may also be changed accordingly.

The inventors of the present inventive concept have found that, a phased-array antenna generally has at least two antenna units, each of which corresponds to a radio frequency channel, and can radiate a beam signal or receive an external electromagnetic wave signal, to implement a communication function. At present, the antenna units in the phased-array antenna are generally calibrated by using a mechanical tool, and parameters such as a calibration matrix, a mutual coupling coefficient, and the like need to be calculated during the calibration process. Thus, a calibration system thereof is complex, and a large amount of labor cost is needed. Further, the calibration efficiency and precision of the calibration system cannot effectively meet calibration requirements, thereby degrading the performance of the phased-array antenna. In order to solve at least one of the above technical problems in the related art, embodiments of the present disclosure provide a system and a method for calibrating a phased-array antenna. The system and the method for calibrating a phased-array antenna provided by the present disclosure will be described in further detail below with reference to the accompanying drawings and exemplary embodiments. It should be understood that there are various types of phased-array antennas, and the calibration system and the calibration method for a phased-array antenna provided by the embodiments of the present disclosure are not only suitable for a liquid crystal phased-array antenna, but also suitable for other types of phased-array antennas. The following description will be made by taking a liquid crystal phased-array antenna as an example.

In a first aspect, an embodiment of the present disclosure provides a calibration system for a phased-array antenna, and FIG. 1 is a schematic diagram showing a structure of the calibration system for a phased-array antenna provided by the present embodiment. As shown in FIG. 1, the calibration system for a phased-array antenna includes: a receiving probe 101, a parameter tester 102, an upper computer (which may also be referred to as a host computer) 103, and a beam controller (i.e., a wave beam controller) 104. The receiving probe 101 is configured to acquire (or receive) a beam signal, which is radiated by a to-be-tested phased-array antenna 106 according to a supplied microwave signal, at a predetermined position. The parameter tester 102 is configured to generate a test parameter (e.g., a preset intensity and/or a preset scanning direction of the beam signal) according to the microwave signal and the beam signal. The upper computer 103 is configured to: determine whether the to-be-tested phased-array antenna 106 meets a preset index or not, according to the test parameter; and if the to-be-tested phased-array antenna 106 does not meet the preset index, calculate the test parameter according to a genetic algorithm to generate optimized beam control data. The beam controller 104 is configured to generate a control voltage according to the optimized beam control data, and transmit the control voltage to the to-be-tested phased-array antenna 106.

The to-be-tested phased-array antenna 106 may be a liquid crystal phased-array antenna. The liquid crystal phased-array antenna may convert a microwave signal provided (or supplied) by another device into the beam signal (e.g., a wave beam) and radiate the beam signal outwards to implement a communication function. During a calibration process, the microwave signal may be provided by the parameter tester 102, whereas during an application process, the microwave signal may be provided by a signal source (e.g., a signal generator) in a communication device. The liquid crystal phased-array antenna is provided with a liquid crystal phase shifter. A rotation angle of liquid crystal molecules in the liquid crystal phase shifter may be controlled by adjusting a control voltage input into the liquid crystal phase shifter so as to adjust a phase of the beam signal, so that the beam signal is scanned along a preset direction. In an embodiment of the present disclosure, one port of the liquid crystal phased-array antenna may be connected to one port of the parameter tester 102 to receive the microwave signal provided by the parameter tester 102; and another port of the liquid crystal phased-array antenna may be connected to one port of the beam controller 104 to receive the control voltage from the beam controller 104 so as to adjust the scanning direction of the beam signal radiated by the liquid crystal phased-array antenna.

The receiving probe 101 may also be a structure such as an antenna that can receive the beam signal radiated by the liquid crystal phased-array antenna. One port of the receiving probe 101 may be connected to one port of the parameter tester 102, so as to transmit the received beam signal radiated by the liquid crystal phased-array antenna to the parameter tester 102.

The parameter tester 102 may generate the test parameter according to the microwave signal provided by the parameter tester 102 and the beam signal radiated by the liquid crystal phased-array antenna. The parameter tester 102 may further be connected to the upper computer, and may transmit the generated test parameter to the upper computer 103.

The upper computer 103 receives the test data (e.g., the test parameter) transmitted from the parameter tester 102, and may determine whether the liquid crystal phased-array antenna meets the preset index according to the test data, i.e., whether the beam signal radiated by the liquid crystal phased-array antenna is scanned according to the preset intensity and/or the preset direction. In other words, the preset index may include the preset intensity and/or the preset direction. If the upper computer 103 determines that the liquid crystal phased-array antenna does not meet the preset index, the upper computer 103 may calculate the test parameter by using a genetic algorithm, to optimize an initial beam control data (e.g., an initial control voltage of each phase shifter in the phased-array antenna 106) according to a certain rule so as to obtain optimized beam control data (e.g., an optimized control voltage of each phase shifter in the phased-array antenna 106), so that the beam signal radiated by the liquid crystal phased-array antenna is scanned according to the preset intensity and/or the preset direction.

One port of the beam controller 104 may be connected to the upper computer 103 to receive the optimized beam control data from the upper computer, and another port of the beam controller 104 may be connected to the liquid crystal phased-array antenna to transmit a control voltage to the liquid crystal phased-array antenna. The beam controller 104 may receive the optimized beam control data obtained by the upper computer through calculation, store the optimized beam control data, generate a control voltage according to the optimized beam control data, transmit the control voltage to the liquid crystal phased-array antenna, and adjust a rotation angle of liquid crystals in each liquid crystal phase shifter of the liquid crystal phased-array antenna through the control voltage, so that the beam signal radiated by the liquid crystal phased-array antenna is scanned according to the preset intensity and/or the preset direction.

In the calibration system for a phased-array antenna provided by an embodiment of the present disclosure, the parameter tester 102 may generate the test data (e.g., the test parameter) according to the microwave signal provided from the parameter tester 102 to the liquid crystal phased-array antenna and the beam signal received by the receiving probe 102, and the upper computer 103 may calculate the test data by using a genetic algorithm, so as to obtain the optimized beam control data. Further, the beam controller 104 may generate the control voltage according to the optimized beam control data, and adjust a rotation angle of the liquid crystals in each liquid crystal phase shifter of the liquid crystal phased-array antenna by using the control voltage, so that the beam signal radiated by the liquid crystal phased-array antenna is scanned according to the preset intensity and/or the preset direction. It can be seen that, the calibration system for a phased-array antenna provided by the present embodiment only needs to perform iterative computation on the test parameter by using a genetic algorithm, to obtain the optimized beam control data without computing parameters such as a calibration matrix and a mutual coupling coefficient. Therefore, the whole calibration process is completed fully automatically, and the calibration system is simple in structure, so that a large amount of labor and time cost can be saved. Because the whole calibration configuration is implemented by adopting a genetic algorithm, an approximation error caused by the conventional calibration algorithm can be avoided, and the calibration efficiency and the calibration precision of the calibration system can meet the calibration requirements, so that the performance of the liquid crystal phased-array antenna can be improved.

In some embodiments, the upper computer 103 may be configured to randomly generate a plurality of initial beam control data as an initial population according to the test parameter, and each initial beam control data in the initial population is taken as an individual. A gain of the to-be-tested phased-array antenna 106 is calculated according to each initial beam control data, and the gain is taken as an adaptability (or a fitness) of a corresponding individual in the initial population. According to the adaptability of the corresponding individual in the initial population, some of the individuals are selected according to a first preset probability and replicated into the next generation to generate the optimized beam control data. For example, the number of the plurality of initial beam control data (or the number of individuals) may be equal to the number of gains (or gain values), i.e., the plurality of initial beam control data (or the individuals) may be in one-to-one correspondence with the gains (or the gain values).

In an embodiment of the present disclosure, a length of an initial beam control code of each antenna unit in the liquid crystal phased-array antenna is 5 bits, and in this case, the initial population P(t) of the genetic algorithm may be generated as N random binary data strings each having the length of 5 bits, and each individual corresponds to one beam control code, which is exemplified in the following Table 1.

TABLE 1

| Serial No. | 1 | 2 | ... | N |
|---|---|---|---|---|
| Value of an individual | 01011 | 10110 | ... | 00100 |

The calibration system for a phased-array antenna may measure antenna gain values corresponding to different individuals, and each antenna gain value may be used as the adaptability of a corresponding individual in the initial population. For example, the higher the antenna gain value is, the higher the adaptability of the corresponding individual in the initial population is, which is exemplified in the following Table 2.

TABLE 2

| Serial No. | 1 | 2 | ... | N |
|---|---|---|---|---|
| Value of an individual | 01011 | 10110 | ... | 00100 |
| Adaptability | 8 | 5 | ... | 11 |

According to the adaptability of each individual in the initial population, the individuals to be replicated into the next generation are selected. The replicating probability may be determined according to the adaptability of each individual in the initial population. In this example, the replicating probability is positively correlated with the adaptabilities of the individuals (e.g., is positively correlated with an average value of the adaptabilities of the individuals). When the same operation is required, the current population is used as the initial population, and the above operation is repeatedly performed, as shown in the following Table 3.

TABLE 3

| Serial No. | 1 | 2 | ... | N |
|---|---|---|---|---|
| Value of an individual | 01011 | 10110 | ... | 00100 |
| Adaptability | 8 | 5 | ... | 11 |
| Selection | 00100 | 01011 | ... | 00100 |

As can be seen from the above table, in the new generation population, the individual 2 is excluded due to its low adaptability, and the individual N obtains more replicates due to its higher adaptability. It should be noted that the applied replicating probability is a first preset probability, and is in positive correlation with the adaptabilities of the individuals, so that it can be ensured that an individual with higher adaptability can be replicated more times to select an optimal individual, thereby facilitating obtaining the optimized beam control data.

In some embodiments, the upper computer 104 may further be configured to perform a crossover operation (which may also be referred to as a cross operation) on some code segments of the individuals entering the next generation, according to a second preset probability. The crossover operation may include: a single-point crossover operation or a multipoint crossover operation.

In an embodiment of the present disclosure, the crossover operation is performed on a population formed by the selected individuals, and some code segments of certain two individuals in the population are exchanged at the second preset probability, for example, by using the single-point crossover operation, as shown in the following Table 4.

TABLE 4

| Serial No. | 1 | 2 | ... | N |
|---|---|---|---|---|
| Value of an individual | 01011 | 10110 | ... | 00100 |
| Adaptability | 8 | 5 | ... | 11 |
| Selection | 00100 | 01011 | ... | 00100 |
| Crossover | 01100 | 00011 | ... | 00100 |

As can be seen from the above table, two most significant bits of the individual 1 are interchanged with two most significant bits of the individual 2 to form two new individuals. In other words, the crossover operation may be an interchanging operation. For example, the single-point crossover operation may be an interchange of one code segment of one individual with one code segment of another individual (i.e., an interchange of two code segments of a pair of individuals), and the multipoint crossover operation may be an interchange of at least two code segments of one individual with at least two code segments of another individual, respectively.

In some embodiments, the host computer 104 may be further configured to perform a mutation operation on some code segments of the individuals entering the next generation, according to a third preset probability. The mutation operation may include: a single-point mutation operation or a multipoint mutation operation.

In an embodiment of the present disclosure, the mutation operation is performed on a population formed by the selected individuals or a population formed by the individuals after the crossover operation, to mutate some code segments of an individual in the population at the third preset probability, for example, by using the single-point mutation operation, as shown in the following Table 5.

TABLE 5

| Serial No. | 1 | 2 | ... | N |
|---|---|---|---|---|
| Value of an individual | 01011 | 10110 | ... | 00100 |
| Adaptability | 8 | 5 | ... | 11 |
| Selection | 00100 | 01011 | ... | 00100 |
| Crossover | 01100 | 00011 | ... | 00100 |
| Mutation | 01100 | 00011 | ... | 00101 |

As can be seen from the above table, the inversion of the fifth bit (i.e., the least significant bit) of the individual N may result in a new individual. In other words, the mutation operation may be an inversion operation. For example, the single-point mutation operation may be the inversion of a single bit of an individual, and the multipoint mutation operation may be the inversion of at least two bits of an individual.

A population formed by individuals obtained through the genetic algorithm (i.e., the crossover operation and/or the mutation operation) may be used as a new population P(t+1), and an adaptability of each individual of the population P(t+1) may be obtained through testing again. Then, a population formed by individuals obtained by performing the genetic algorithm on the population P(t+1) may be taken as a new population P(t+2), and an adaptability of each individual of the population P(t+2) may be obtained through testing again. The above genetic algorithm may be repeated until a preset stop condition is satisfied. In this way, the individual with the highest adaptability will be obtained, i.e., the optimized wave beam control code with the optimal gain of the liquid crystal phased-array antenna is obtained.

The calibration system for a phased-array antenna may further include a microwave darkroom 105 and a motion driver 107 (as shown in FIG. 1). The to-be-tested phased-array antenna 106 and the receiving probe 101 are disposed in the microwave darkroom 105. The motion driver 107 is configured to control the receiving probe 101 to move in the scanning direction of the beam signal radiated by the to-be-tested phased-array antenna 106.

Figure 2:
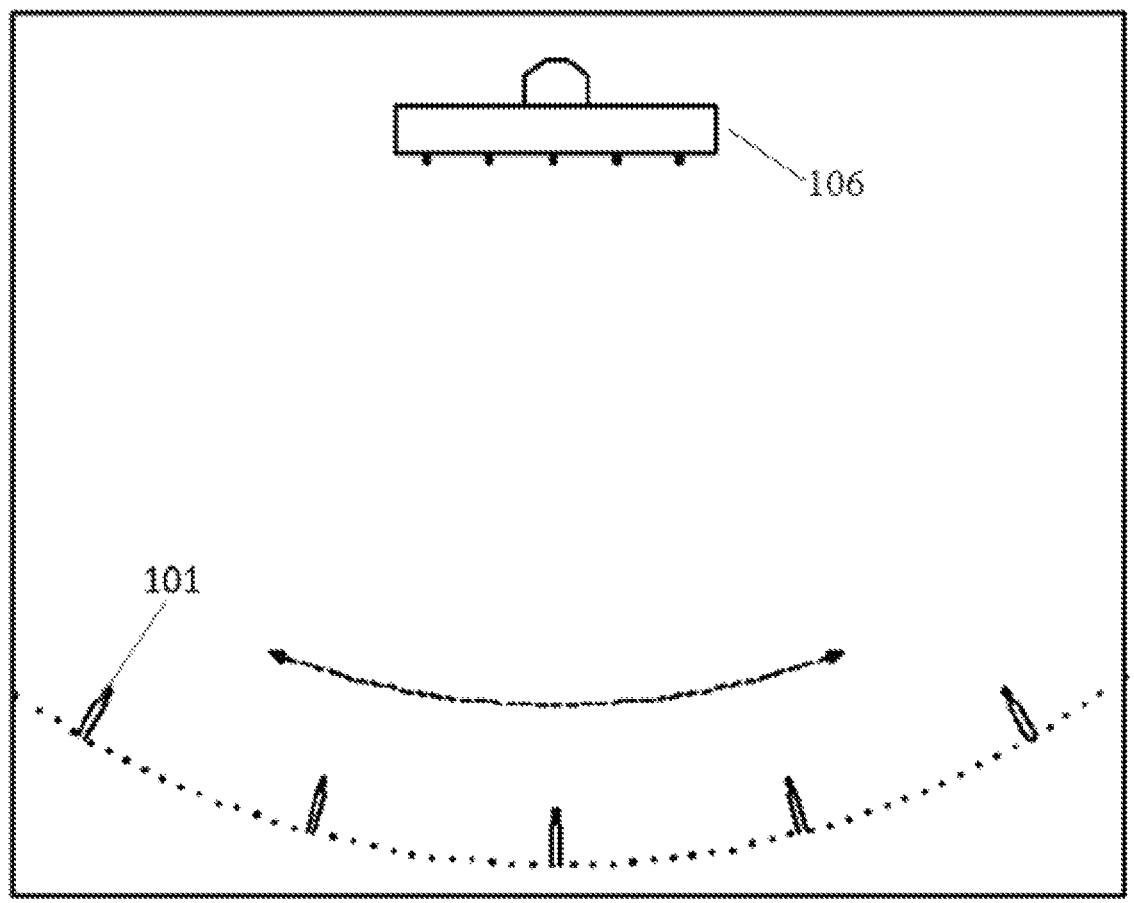
FIG. 2 is a schematic diagram showing a movement trajectory of a receiving probe in a calibration system for a phased-array antenna according to an embodiment of the present disclosure.

In a practical application, both the liquid crystal phased-array antenna and the receiving probe may be disposed in the microwave darkroom 105. The microwave darkroom is a closed environment, and a shielding material is arranged on a sidewall of the microwave darkroom, so that on one hand, signals in the external environment are prevented from interfering with signals of the liquid crystal phased-array antenna and the receiving probe 101, and on the other hand, other signals radiated by the liquid crystal phased-array antenna are prevented from being transmitted to the receiving probe 101 so as to avoid interference on the received beam signal. The receiving probe 102 may be mounted on the motion driver 107, and the motion driver 107 may control the receiving probe 101 to move along the scanning direction of the beam signal radiated by the to-be-tested phased-array antenna 106. For example, the receiving probe 101 may rotate clockwise or counterclockwise on a circle, which has a point where the phased-array antenna 106 is located as a center and a distance between the receiving probe 101 and the phased-array antenna 106 as a radius. A movement trajectory of the receiving probe 101 is shown in FIG. 2.

In some embodiments, the parameter tester 102 includes a vector network analyzer. In this case, the test parameter generated by the parameter tester 102 according to the microwave signal and the beam signal may include: a phase, an input reflection coefficient, an output reflection coefficient, a voltage standing wave ratio, an impedance (or admittance), an attenuation (or a gain), a phase shift, a group delay, an isolation degree, an orientation degree, and/or the like.

In particular, the parameter tester 102 may be a vector network analyzer provided with two ports. One of the two ports may provide the microwave signal to the liquid crystal phased-array antenna, and the other of the two ports may transmit the beam signal received by the receiving probe 101. In addition, the parameter tester 102 may generate the test parameter to determine whether the performance of the liquid crystal phased-array antenna reaches (or meets) the preset index.

In some embodiments, the parameter tester 102 includes a spectrum analyzer and a microwave signal source (e.g., a microwave signal generator). In this case, the test parameter generated by the parameter tester 102 according to the microwave signal and the beam signal may include a distortion degree, a modulation degree, a spectrum purity, a frequency stability, an intermodulation distortion degree, and/or the like.

In some embodiments, the parameter tester 102 includes a power meter and a microwave signal source (e.g., a microwave signal generator). In this case, the test parameter generated by the parameter tester 102 according to the microwave signal and the beam signal may include a power, an intensity, and/or the like.

In some embodiments, the parameter tester 102 includes a phase detector. In this case, the test parameter generated by the parameter tester 102 according to the microwave signal and the beam signal may include a phase and/or the like.

Specifically, the microwave signal source may provide the microwave signal to the liquid crystal phased-array antenna, and the spectrum analyzer may analyze the beam signal received by the receiving probe 101 and generate the test parameter, to determine whether the performance of the liquid crystal phased-array antenna reaches the preset index.

In some embodiments, the receiving probe 101 may be an antenna.

In some embodiments, the host computer 103 may be a laptop computer, a desktop computer, a server computer, or the like.

In some embodiments, the functions of the beam controller 104 may be implemented by the upper computer 103. Alternatively, the beam controller 104 may be a Field Programmable Gate Array (FPGA) having the corresponding functions disclosed in the present disclosure, and further, the beam controller 104 may further include a memory (e.g., a flash memory) for storing various data and programs.

In some embodiments, the motion driver 107 includes a motor, a turnplate (or a turntable), a conveyor belt, or the like.

For example, each of the second preset probability and the third preset probability may be greater than zero and less than 1, and in particular, may be equal to 0.5. As such, an efficiency of calibration is improved while a computation amount is reduced.

The calibration system for a phased-array antenna according to any one of the foregoing embodiments of the present disclosure has at least the advantages of a simple structure, a higher calibration efficiency, and a higher calibration accuracy.

Figure 3:
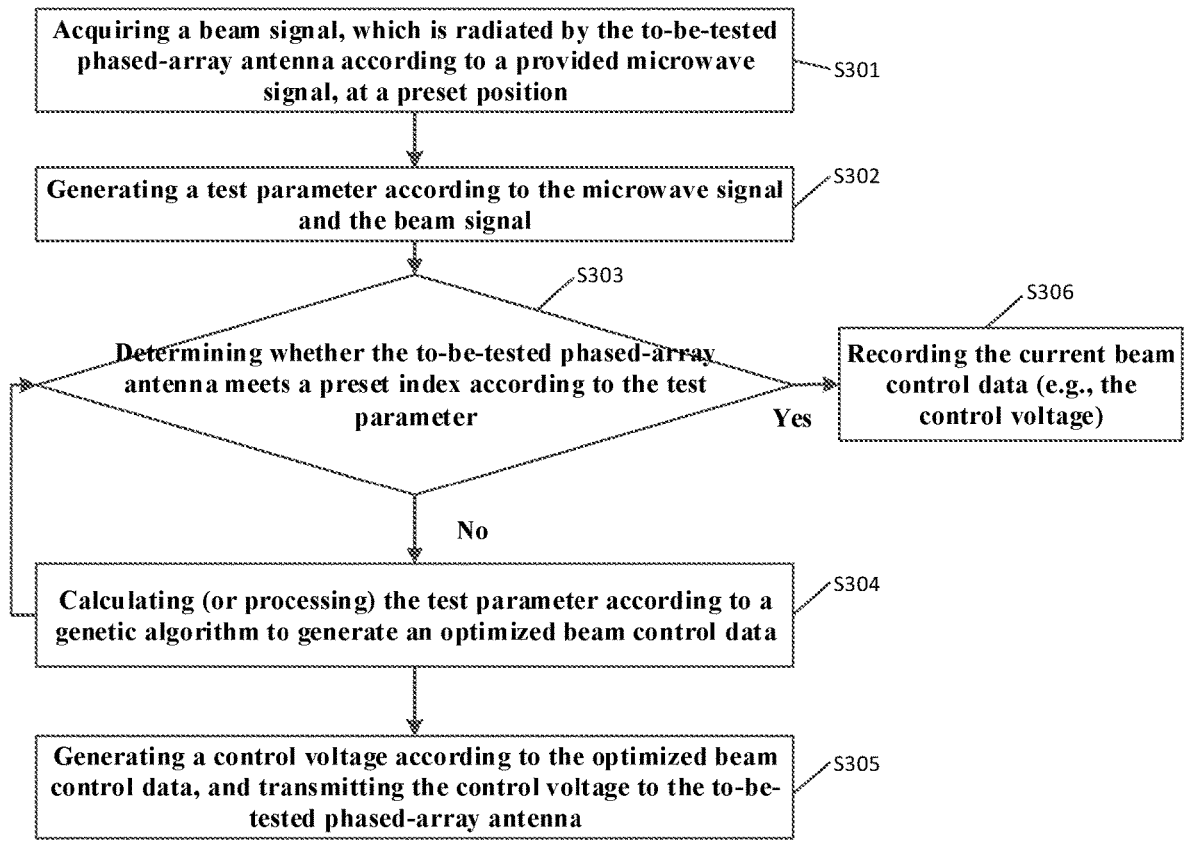
FIG. 3 is a schematic flowchart of a calibration method for a phased-array antenna according to an embodiment of the present disclosure.

In a second aspect, an embodiment of the present disclosure provides a method for calibrating a phased-array antenna (i.e., a calibration method for a phased-array antenna). FIG. 3 is a schematic flowchart of the method for calibrating a phased-array antenna according to the present embodiment. As shown in FIG. 3, the calibration method for a phased-array antenna may include the following steps S301 to S306.

Step S301 may include acquiring a beam signal, which is radiated by the to-be-tested phased-array antenna according to a provided microwave signal, at a preset position.

Step S302 may include generating a test parameter according to the microwave signal and the beam signal.

Step S303 may include determining whether the to-be-tested phased-array antenna meets a preset index according to the test parameter. Then, the calibration method proceeds to step S304 in a case where the to-be-tested phased-array antenna does not meet the preset index, and proceeds to step S306 in a case where the to-be-tested phased-array antenna meets the preset index.

Step S304 may include calculating (or processing) the test parameter according to a genetic algorithm to generate an optimized beam control data.

Step S305 may include generating a control voltage according to the optimized beam control data, and transmitting the control voltage to the to-be-tested phased-array antenna.

Step S306 may include recording the current beam control data (e.g., the control voltage).

It should be noted that, steps S301 to S306 of the calibration method for a phased-array antenna according to the present embodiment may be respectively executed by the receiving probe 101, the parameter tester 102, the upper computer 103, and the beam controller 104 of the calibration system for a phased-array antenna according to an embodiment of the present disclosure, and the resultant technical effects and detailed implementation manners thereof may be referred to the description of the technical effects and the implementation manners of the calibration system for a phased-array antenna, and thus, will not be repeated here.

In the description of the present disclosure, reference to the terms "an embodiment", "some embodiments", "an example", "a specific example", "some examples", or the like means that a particular feature, structure, material, or characteristic described in connection with the embodiment or example is included in at least one embodiment or example of the present disclosure. Further, the particular feature, structure, material, or characteristic described may be combined in any suitable manner in any one or more embodiments or examples. Moreover, various embodiments or examples and features of various embodiments or examples described herein may be combined together by one of ordinary skill in the art in a case of no explicit conflict.

Further, the terms "first", "second", and the like are used for descriptive purposes only and are not to be construed as indicating or implying relative importance or to implicitly indicate the number of technical features indicated. Thus, a feature defined by the term "first" or "second" may explicitly or implicitly include at least one such feature. In the description of the present disclosure, "a plurality" means two or more, unless specifically limited otherwise.

Any process or method described in a flowchart or otherwise described herein may be understood as representing a set, segment, or portion of codes which include one or more executable instructions of steps for implementing specific logical functions or processes, and alternate implementations are included within the scope of the exemplary embodiments of the present disclosure in which functions may be executed out of order from that shown or discussed, including substantially concurrently or in reverse order, depending on the function involved, as would be understood by one of ordinary skill in the art to which the embodiments of the present disclosure pertain.

In a third aspect, an embodiment of the present disclosure provides a non-transitory (or non-volatile) computer-readable storage medium, on which a computer program is stored, and when executed by a processor, the program implements the calibration method for a phased-array antenna according to any one of the foregoing embodiments. The implementation principle and beneficial effects of the non-transitory computer readable storage medium are the same as those of the calibration method for a phased-array antenna, and will not be repeated here.

The logic and/or steps represented in a flowchart or otherwise described herein, may be understood as an ordered listing of executable instructions for implementing logical functions, and may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. For the purposes of this description, a "computer-readable medium" may be any means that can contain, store, communicate, transmit, or transport the program for use by or in connection with the instruction execution system, apparatus, or device.

More specific examples (a non-exhaustive list) of the computer-readable medium may include the following: an electrical connection component (electronic device) having one or more wires, a portable computer diskette (magnetic device), a Random Access Memory (RAM), a read-only memory (ROM), an erasable programmable read-only memory (EPROM or flash memory), an optical fiber device, and a portable read-only memory (CDROM). Further, the computer-readable medium may even be paper or another suitable medium upon which the program is printed, as the program can be electronically obtained (captured), via for instance optical scanning of the paper or other medium, then compiled, interpreted or otherwise processed in a suitable manner if necessary, and then stored in a computer memory.

It should be understood that portions of the present disclosure may be implemented in hardware, software, firmware, or a combination thereof. In the above embodiments, various steps or methods may be implemented in software or firmware stored in a memory and executed by a suitable instruction execution system. For example, if various steps or methods are implemented in hardware as in another embodiment, any one or combination of the following technologies, which are well known in the art, may be adopted to implement the various steps or methods: a discrete logic circuit having a logic gate circuit for implementing a logic function on a data signal, an application specific integrated circuit having an appropriate combination of logic gate circuits, a Programmable Gate Array (PGA), a Field Programmable Gate Array (FPGA), and the like.

It will be understood by one of ordinary skill in the art that all or part of the steps carried out in the method for implementing the above embodiments may be implemented by hardware related to instructions of a program, which may be stored in a computer readable storage medium, and when the program is executed, one or a combination of the steps included in the method embodiments is implemented.

In addition, functional units in an embodiment of the present disclosure may be integrated into one processing unit, or the functional units may separately exist physically, or two or more of the functional units may be integrated into one component. The integrated component may be realized in a hardware form, or may be realized in a software functional component form. The integrated component, if implemented in software functional components and sold or used as a stand-alone product, may also be stored in at least one computer readable storage medium, which may be a read-only memory, a magnetic or optical disk, or the like.

It should be understood that the above embodiments are merely exemplary embodiments adopted to illustrate the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. A calibration system for a phased-array antenna, comprising: a receiving probe, a parameter tester, an upper computer, and a beam controller; wherein
the receiving probe is configured to acquire a beam signal, which is radiated by a to-be-tested phased-array antenna according to a microwave signal, at a preset position;
the parameter tester is configured to generate a test parameter according to the microwave signal and the beam signal;
the upper computer is configured to determine whether the to-be-tested phased-array antenna meets a preset index according to the test parameter, and in a case where the to-be-tested phased-array antenna does not meet the preset index, calculate the test parameter according to a genetic algorithm to generate optimized beam control data; and
the beam controller is configured to generate a control voltage according to the optimized beam control data, and transmit the control voltage to the to-be-tested phased-array antenna.

2. The calibration system according to claim 1, wherein the upper computer is further configured to
randomly generate a plurality of initial beam control data as an initial population according to the test parameter, wherein each of the plurality of initial beam control data in the initial population is an individual;
calculate gains of the to-be-tested phased-array antenna according to the plurality of initial beam control data, wherein the gains are used as adaptabilities of individuals in the initial population, respectively; and
select some of the individuals, according to the adaptabilities of the individuals in the initial population, at a first preset probability, and replicate selected individuals into a next generation to generate the optimized beam control data.

3. The calibration system according to claim 2, wherein the first preset probability has a positive correlation with the adaptabilities.

4. The calibration system according to claim 2, wherein the upper computer is further configured to
perform a crossover operation on some code fragments of the individuals entering the next generation, at a second preset probability.

5. The calibration system according to claim 4, wherein the crossover operation comprises a single-point crossover operation or a multipoint crossover operation.

6. The calibration system according to claim 2, wherein the upper computer is further configured to
perform a mutation operation on some code fragments of the individuals entering the next generation, at a third preset probability.

7. The calibration system according to claim 6, wherein the mutation operation comprises a single-point mutation operation or a multipoint mutation operation.

8. The calibration system according to claim 1, further comprising a microwave darkroom and a motion driver, wherein
the to-be-tested phased-array antenna and the receiving probe are in the microwave darkroom; and
the motion driver is configured to control the receiving probe to move along a scanning direction of the beam signal radiated by the to-be-tested phased-array antenna.

9. The calibration system according to claim 1, wherein the parameter tester comprises a vector network analyzer.

10. The calibration system according to claim 1, wherein the parameter tester comprises a spectrum analyzer and a microwave signal source.

11. The calibration system according to claim 1, wherein the parameter tester comprises a power meter and a microwave signal source.

12. The calibration system according to claim 1, wherein the phased-array antenna comprises a liquid crystal phased-array antenna.

13. A calibration method for a phased-array antenna, comprising:
acquiring a beam signal, which is radiated by a to-be-tested phased-array antenna according to a provided microwave signal, at a preset position;
generating a test parameter according to the microwave signal and the beam signal;
determining whether the to-be-tested phased-array antenna meets a preset index according to the test parameter, and in a case where the to-be-tested phased-array antenna does not meet the preset index, calculating the test parameter according to a genetic algorithm to generate optimized beam control data; and
generating a control voltage according to the optimized beam control data, and transmitting the control voltage to the to-be-tested phased-array antenna.

14. The calibration method according to claim 13, further comprising:
randomly generating a plurality of initial beam control data as an initial population according to the test parameter, wherein each of the plurality of initial beam control data in the initial population is an individual;
calculating gains of the to-be-tested phased-array antenna according to the plurality of initial beam control data, and taking the gains as adaptabilities of individuals in the initial population; and
selecting some of the individuals, according to the adaptabilities of the individuals in the initial population, at a first preset probability, and replicating selected individuals into a next generation to generate the optimized beam control data.

15. The calibration method according to claim 14, wherein the first preset probability is positively correlated with the adaptabilities.

16. The calibration method according to claim 14, further comprising:
performing a crossover operation on some code fragments of the individuals entering the next generation, at a second preset probability.

17. The calibration method according to claim 16, wherein the crossover operation comprises a single-point crossover operation or a multipoint crossover operation.

18. The calibration method according to claim 14, further comprising:
performing a mutation operation on some code fragments of the individuals entering the next generation, at a third preset probability.

19. The calibration method according to claim 18, wherein the mutation operation comprises a single-point mutation operation or a multipoint mutation operation.

20. A non-transitory computer-readable storage medium, having a computer program stored thereon, wherein the computer program, when executed by a processor, implements the calibration method for a phased-array antenna according to claim 13.

\* \* \* \* \*